(12) United States Patent
Subramanian et al.

(10) Patent No.: US 9,776,282 B2
(45) Date of Patent: Oct. 3, 2017

(54) LASER ADDITIVE MANUFACTURE OF THREE-DIMENSIONAL COMPONENTS CONTAINING MULTIPLE MATERIALS FORMED AS INTEGRATED SYSTEMS

(71) Applicant: SIEMENS ENERGY, INC., Orlando, FL (US)

(72) Inventors: Ramesh Subramanian, Oviedo, FL (US); Ahmed Kamel, Orlando, FL (US); Gerald J. Bruck, Oviedo, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 338 days.

(21) Appl. No.: 14/513,535

(22) Filed: Oct. 14, 2014

(65) Prior Publication Data
US 2015/0034604 A1    Feb. 5, 2015

Related U.S. Application Data

(63) Continuation-in-part of application No. 14/043,037, filed on Oct. 1, 2013.
(Continued)

(51) Int. Cl.
*B23K 26/00* (2014.01)
*B23K 26/34* (2014.01)
(Continued)

(52) U.S. Cl.
CPC .......... *B23K 26/345* (2013.01); *B22F 3/1055* (2013.01); *B22F 5/009* (2013.01);
(Continued)

(58) Field of Classification Search
CPC .................. B22F 2999/00; B22F 3/1055; B22F 2203/00; B22F 2207/01; B22F 2003/1057;
(Continued)

(56) References Cited

U.S. PATENT DOCUMENTS

| 4,323,756 A | 4/1982 | Brown et al. |
| 4,810,525 A * | 3/1989 | Morita ................. B23K 26/34 |
| | | 427/125 |

(Continued)

FOREIGN PATENT DOCUMENTS

KR    20130082117 A    7/2013

OTHER PUBLICATIONS

I. Yadroitsev, Ph. Bertrand, B. Laget, and I. Smurov; Application of laser assisted technologies for fabrication of functionally graded coatings and objects for the International Thermonuclear Experimental Reactor components; Journal of Nuclear Materials 362 (2007); pp. 189-196.
(Continued)

*Primary Examiner* — Sang Y Paik

(57) ABSTRACT

Methods for laser additive manufacture are disclosed in which a plurality of powder layers (48, 50 and 52) are delivered onto a working surface (54A) to form a multi-powder deposit containing at least two adjacent powders layers in contact, and then applying a first laser energy (74) to a first powder layer (48) and a second laser energy (76) to a second powder layer (52) to form a section plane of a multi-material component. The multi-powder deposit may include a flux composition that provides at least one protective feature. The shapes, intensities and trajectories of the first and second laser energies may be independently controlled such that their widths are less than or equal to widths of the first and second powder layers, their intensities are tailored to the compositions of the powder layers, and their scan paths define the final shape of the multi-material component.

14 Claims, 5 Drawing Sheets

Related U.S. Application Data

(60) Provisional application No. 61/710,995, filed on Oct. 8, 2012, provisional application No. 61/711,813, filed on Oct. 10, 2012.

(51) Int. Cl.

| | | |
|---|---|---|
| *B28B 1/00* | (2006.01) | |
| *B23K 25/00* | (2006.01) | |
| *B22F 3/105* | (2006.01) | |
| *B22F 5/00* | (2006.01) | |
| *B22F 5/04* | (2006.01) | |
| *B22F 7/02* | (2006.01) | |
| *B22F 7/06* | (2006.01) | |
| *F01D 5/28* | (2006.01) | |
| *B33Y 10/00* | (2015.01) | |
| *B23K 26/32* | (2014.01) | |
| *B23K 26/342* | (2014.01) | |
| *B23P 6/00* | (2006.01) | |
| *B23K 103/00* | (2006.01) | |
| *B23K 103/18* | (2006.01) | |

(52) U.S. Cl.
CPC ............... *B22F 5/04* (2013.01); *B22F 7/02* (2013.01); *B22F 7/06* (2013.01); *B23K 25/005* (2013.01); *B23K 26/0006* (2013.01); *B23K 26/32* (2013.01); *B23K 26/342* (2015.10); *B28B 1/001* (2013.01); *B28B 1/008* (2013.01); *B33Y 10/00* (2014.12); *F01D 5/288* (2013.01); *B22F 2003/1057* (2013.01); *B22F 2999/00* (2013.01); *B23K 2203/18* (2013.01); *B23K 2203/26* (2015.10); *B23K 2203/50* (2015.10); *B23K 2203/52* (2015.10); *B23P 6/007* (2013.01); *F05D 2230/31* (2013.01); *Y02P 10/295* (2015.11); *Y10T 428/24545* (2015.01)

(58) Field of Classification Search
CPC .... B22F 5/009; B22F 5/04; B22F 7/02; B22F 7/06; B23K 2203/18; B23K 2203/26; B23K 2203/50; B23K 2203/52; B23K 25/005; B23K 26/32; B23K 26/342; B23K 26/345; B23P 6/007; B33Y 10/00; F01D 5/288; F05D 2230/31; Y02P 10/295; Y10T 428/24545; B28B 1/001; B28B 1/008
USPC .......................................... 219/121.6–121.83
See application file for complete search history.

(56) References Cited

U.S. PATENT DOCUMENTS

| | | | |
|---|---|---|---|
| 4,904,542 A * | 2/1990 | Mroczkowski | C23C 14/0652 416/241 B |
| 5,908,719 A * | 6/1999 | Guckel | G03F 1/22 430/22 |
| 6,268,585 B1 * | 7/2001 | Ichikawa | B23K 26/073 219/121.69 |
| 6,355,086 B2 | 3/2002 | Brown et al. | |
| 6,637,643 B2 | 10/2003 | Hasz et al. | |
| 7,186,092 B2 * | 3/2007 | Bruce | C23C 30/00 415/217.1 |
| 7,231,275 B2 | 6/2007 | Silverbrook | |
| 7,879,282 B2 | 2/2011 | Hopkinson et al. | |
| 8,319,148 B2 * | 11/2012 | Nowak | B23K 26/0604 219/121.76 |
| 2005/0133527 A1 | 6/2005 | Dullea et al. | |
| 2006/0165552 A1 * | 7/2006 | Kapoor | B23K 35/0261 420/70 |
| 2006/0278618 A1 * | 12/2006 | Forrest | B23K 26/0604 219/121.64 |
| 2011/0226390 A1 * | 9/2011 | Chen | C22C 19/00 148/527 |
| 2011/0311389 A1 | 12/2011 | Ryan et al. | |
| 2012/0181255 A1 * | 7/2012 | Bruck | B23K 9/324 219/73.2 |
| 2013/0052442 A1 | 2/2013 | Merrill et al. | |
| 2013/0140278 A1 | 6/2013 | Bruck et al. | |
| 2014/0099476 A1 | 4/2014 | Subramanian et al. | |
| 2014/0252685 A1 | 9/2014 | Stucker et al. | |

OTHER PUBLICATIONS

Zack Chan, Travis Nicholes, Samson Onevanthana, and Shelley Sakuda; Exploration of Multi-Material Additive Manufacturing; University of Washington, Mechanical Engineering Department.; Mar. 16, 2011; pp. 1-67.

Martin Lamonica; GE, the world's largest manufacturer, is on the verge of using 3-D printing to make jet parts; MIT Technology Review; v1.13.05.10; Apr. 23, 2013; pp. 1-2.

M. Ott and M. F. Zaeh; Multi-Material Processing in Additive Manufacturing; Institute for Machine Tools and Industrial Management, Technische Universitaet Muenchen, Germany; Sep. 23, 2010; pp. 195-203.

O. Homburg, F. Kubacki, D. Hauschild and V. Lissotschenko, "Efficient beam shaping for high power laser applications," LTJ, Jan. 2007, vol. 4, Issue 1.

\* cited by examiner

LASER ADDITIVE MANUFACTURE OF THREE-DIMENSIONAL COMPONENTS CONTAINING MULTIPLE MATERIALS FORMED AS INTEGRATED SYSTEMS

This application is a continuation-in-part of U.S. non-provisional application Ser. No. 14/043,037 filed on Oct. 1, 2013, and published as US 2014/0099476 on Apr. 10, 2014, which claims the benefit of U.S. provisional Application No. 61/710,995 filed on Oct. 8, 2012, and which also claims the benefit of U.S. provisional Application No. 61/711,813 filed on Oct. 10, 2012, the entire contents of all of which are incorporated herein by reference.

FIELD OF THE INVENTION

The present invention relates to materials technology in general and more specifically to the manufacture and repair of multi-material components using laser powder deposition of ceramic and metallic materials in the optional presence of flux compositions.

BACKGROUND OF THE INVENTION

Additive manufacturing enables a component to be fabricated by building it in layers. When applied to the manufacture of metallic or ceramic objects, each layer is melted, sintered, or otherwise integrated onto a previous layer such that each layer may be modeled as a slice or sectional plane of the final object. For example, selective laser melting (SLM) and selective laser sintering (SLS) have been used to build components layer by layer from powder beds. In these processes a powder bed of a component final material, or a precursor material, is deposited onto a working surface, and then laser energy is directed onto the powder bed following a cross-sectional area shape of the component to create a layer or slice of the component. The deposited layer or slice then becomes a new working surface for the next layer.

While SLM and SLS are generally limited to flat working surfaces, laser microcladding is a 3D-capable process that deposits a small, thin layer of material onto a surface by using a laser beam to melt a flow of powder directed towards the surface of an object. In laser microcladding the powder is propelled towards the surface by a jet of gas, and when the powder is a metallic material the gas is usually a protective inert gas, such as argon, which is capable of shielding the resulting molten metal from atmospheric oxygen. Laser microcladding is limited, however, by its low deposition rate which ranges from about 1 to 6 $cm^3/hr$. Furthermore, because the protective gas tends to dissipate before the clad material is fully cooled, superficial oxidation and nitridation may occur on the surface of the deposit. Such impurities can be especially problematic when multiple layers of clad material are necessary to achieve a desired cladding thickness.

A similar problem also tends to occur when superalloy components are fabricated using SLM or SLS. Even when melted superalloy materials are shielded from the atmosphere by applying inert gases such as argon during laser heating, these processes tend to trap oxides (e.g., aluminum and chromium oxides) within the layer of deposited material—resulting in porosity, inclusions and other mechanical defects (e.g., cracking) associated with the trapped oxides. To mitigate this problem, post-deposition processes such as hot isostatic pressing (HIP) have been used to collapse these voids, inclusions and cracks in order to improve the thermal and mechanical properties of the deposited coating.

It has been proposed to employ SLM and SLS of static beds of powdered metal alloys in order to manufacture superalloy components by additive manufacturing. However, components produced using these techniques have been limited due to low productivity and quality. Use of static beds of powdered materials greatly limits productivity because the incrementally-deposited layers tend to be very thin. Moreover, the interface between incrementally processed layers or planes is often subject to defects and questionable physical properties. Use of mixed bed approaches also does not allow for selective placement of different materials to form integrated systems containing multiple materials. Such integrated systems may include, for example, an inner superalloy substrate coated with a diffusion bonded MCrAlY coating which is further bonded to an outer ceramic thermal barrier coating (TBC).

Selective placement of different materials would be necessary in order to employ laser additive manufacturing (LAM) techniques to efficiently produce multi-material components containing integrated systems such as the gas turbine airfoil 20 illustrated in FIG. 1. FIG. 1 is a cross-sectional view of an exemplary gas turbine airfoil 20 containing a leading edge 22, a trailing edge 24, a pressure side 26, a suction side 28, a metal substrate 30, cooling channels 32, partition walls 34, turbulators 36, film cooling exit holes 38, cooling pins 40, and trailing edge exit holes 42. In this example, whereas the metal substrate 30, partition walls 34, turbulators 36 and cooling pins 40 are fabricated of a superalloy material, the exterior surfaces of the airfoil substrate 30 are coated with a porous ceramic thermal barrier coating 44. A metallic bond coat 45 such as an MCrAlY may also be applied between the superalloy substrate 30 and the thermal barrier coating 44 to enhance bonding between the superalloy and ceramic layers and to further protect the superalloy material from external oxidants.

Thus, use of LAM techniques to produce a multi-material component such as the airfoil 20 of FIG. 1 would require not only the selective placement of different materials, but it would also require an ability to selectively apply different processing conditions (i.e., placement and intensity of laser heating) to these different materials. This is because selective melting of a superalloy powder to form the metal substrate 30 would generally require different heating conditions than selective sintering of a ceramic powder to form the thermal barrier coating 44. Another serious complication arises from the need to protect the superalloy powder and resulting metal substrate 30 from reacting with atmospheric oxidants such as oxygen and nitrogen. Especially for a large airfoil 20, the use of LAM techniques could also require an ability to perform SLM and SLS under atmospheric conditions without jeopardizing the chemical and/or physical properties of the resulting component.

BRIEF DESCRIPTION OF THE DRAWINGS

The invention is explained in the following description in view of the drawings that show.

DETAILED DESCRIPTION OF THE INVENTION

Figure 1:
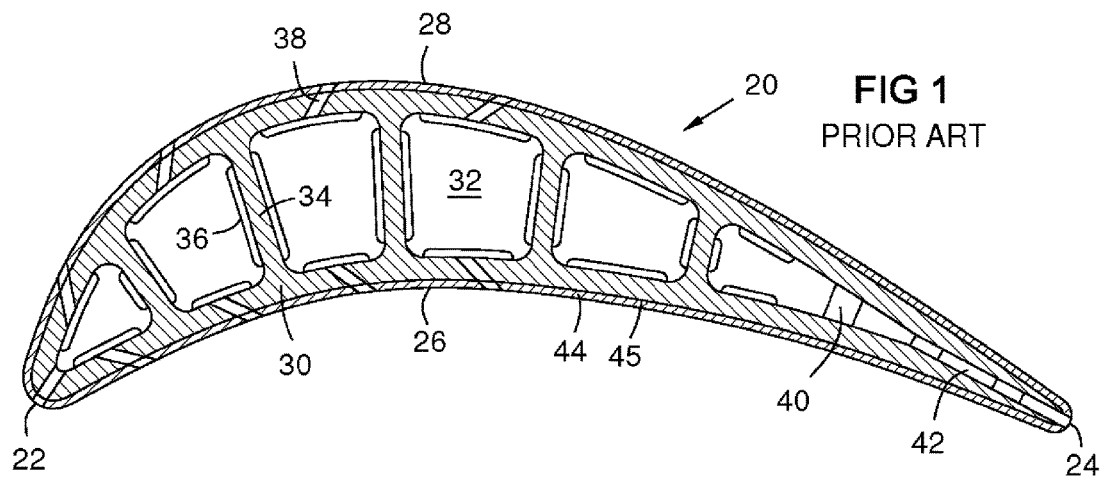
FIG. 1 is a sectional view of an exemplary gas turbine airfoil.

The present inventors have recognized that a need exists to discover methods and materials that enable multi-material components, such as the exemplary airfoil 20 of FIG. 1, to be fabricated using laser additive manufacturing (LAM). Ideal methods would allow respective materials of the component to be selectively placed and processed in a simple and efficient manner that avoids the chemical and mechanical imperfections described above—while ensuring adequate inter-bonding and dimensional integrity of integrated system layers in the final component. Ideal methods would also allow large-sized components to be fabricated without the need to employ rigorously air-free conditions while still minimizing unwanted chemical and mechanical imperfections.

The inventors have discovered methods for additive manufacturing multi-material components which contain dimensionally-complex, three-dimensional features including integrated systems. In these methods separate powdered materials corresponding to the different structural materials of the final component are delivered onto a working surface to produce a multi-powder deposit in which the content and dimensions (i.e., width, thickness and overlap) of multiple-adjacent powder layers can be precisely controlled. Laser heating of the multiple-adjacent powder layers is then carried out such that both the shape and intensity of laser energy applied to different powder layers is tailored to accommodate the content and dimensions of the different powder layers. Laser absorbing materials can also be used to further define the shape and intensity of the laser heating in order to impart intricate structural features to the resulting components. The laser heating of the respective powder layers causes melting or sintering of the powders as appropriate to form metallic and/or ceramic layers as an integrated system constituting a sectional plane (i.e., slice) of the final component. Reaction of sensitive metals with atmospheric agents (e.g., $O_2$ and $N_2$) can also be minimized by performing this heating in the presence of flux compositions formulated for use in laser powder deposition.

Various combinations of these processing steps may be performed in an additive manner such that sectional planes resulting from the laser powder depositions can serve as new working surfaces onto which additional sectional planes may be deposited to form dimensionally-complex, multi-material components such as the exemplary airfoil 20 of FIG. 1. The ability to independently control the shape, trajectory and intensity of laser energy in order to accommodate the content and dimensions of the multiple-adjacent powder layers is expected to greatly increase the structural integrity of the resulting components as well as the efficiency of the additive manufacturing processes. Furthermore, the use of flux compositions formulated for laser powder deposition is expected to reduce unwanted chemical and mechanical imperfections while at the same time avoiding the need to perform post-deposition process steps such as hot isostatic pressing (HIP).

Figure 2:
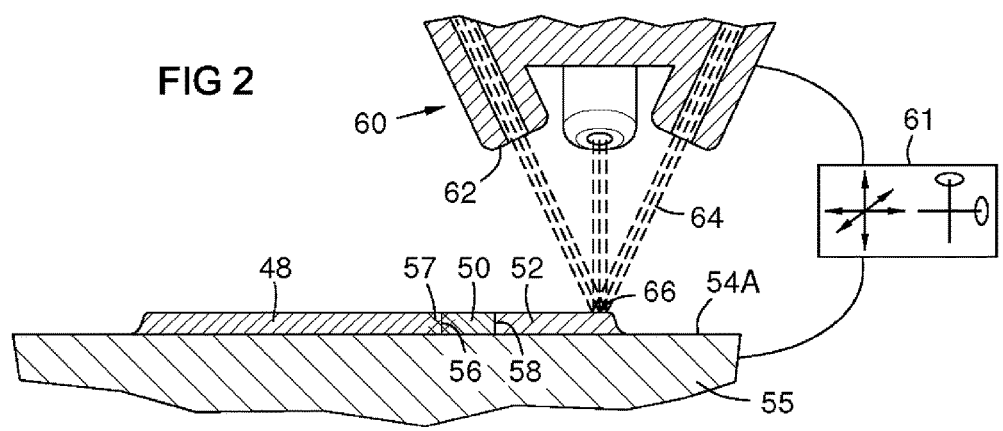
FIG. 2 is a sectional view showing a powder delivery device forming adjacent powder layers on a working surface.

FIG. 2 shows a process and apparatus for delivering first 48, second 50, and third 52 adjacent powder layers onto a working surface 54A in respective first, second and third section area shapes in a given section plane of a component. The resulting multi-powder deposit defines at least in part the shape and composition of a resulting section plane formed by laser processing. The first 48, second 50 and third 52 powder layers may include metallic and/or ceramic components such that the resulting section plane forms an integrated system containing a substrate metal bonded to ceramic thermal coating (TBC) via an intermediate bond coating. For example, the first powder layer 48 may be a structural metal delivered in the area shape of the airfoil substrate 30 as shown in FIG. 1, the second powder layer 50 may be a bond coat material delivered adjacent to the first powder layer 48 in the area shape of the bond coat 45, and the third powder layer 52 may be a ceramic material delivered adjacent to the second powder layer 50 in the area shape of the thermal barrier coating 44. In some embodiments at least one of the powder layers may also contain a flux composition, which provides at least one protective feature as described below. In other embodiments at least one of the powder layers may be covered by a separate layer of a flux composition.

In some embodiments, adherence of the multi-powder deposit to the working surface 54A may be increased by initially contacting the respective first, second and/or third powders with an adherent substance such as water, an alcohol, a lacquer or a binder. Such pre-wetting of the powders with a glue-like substance can also improve inter-layer adherence of the respective layers in order to control material gradients at overlap zones between the respective layers. Alternatively, or in addition thereto, in some embodiments adherence of the multi-powder deposit to the working surface 54A may be increased by laser processing (melting or sintering) the respective powder layers immediately following powder deposition. In such embodiments the respective layers may be simultaneously melted (at the same location) immediately following powder deposition, or may be deposited and immediately melted at different locations. For example, the superalloy powder 48 may be deposited and immediately melted to the working surface 54 first using a broad high-energy laser beam to form a resulting super-alloy layer, then a bond coat material 50 may be deposited and immediately melted adjacent to a solid edge of the superalloy layer using a more focused laser beam to form a bond coat layer, and finally a ceramic material 52 may then be deposited and immediately sintered adjacent to a solid edge of the bond coat layer using a laser beam adjusted to enhance sintering to form a bond coat layer.

An interface 56 between the first and second powders may also be delivered so as to form an overlap zone 57 that provides a material gradient transition between the two adjacent powder layers 48, 50. An interface 58 between the second and third powders layers 50, 52 may also be delivered so as to form an engineered mechanical interlock. In one embodiment, for example, the engineered mechanical interlock may be formed from interleaved fingers of the second and third powder layers 50, 52 projecting alternately into one another. This arrangement of interleaved fingers is depicted in FIG. 9 of Pub. No. US 2014/0099476 (application Ser. No. 14/043,037), the contents of which are incorporated herein by reference.

The powder delivery device 60 may have one or more nozzles 62 adapted to delivery powder spray 64 to a focal point 66. The powder delivery device 60 may incorporate multi-axis movements 61 relative to the working surface 54A, so that the nozzle can follow non-linear sectional profiles in a given horizontal plane, can move to different planes or over different distances relative to the working surface 54A, and can deliver multiple powders at varying velocities and at varying angles. The multi-axis movements 61 may occur by motions of the work table 55 and/or by motions of the powder delivery device 60 via tracks and rotation bearings under computer control. Powder delivery parameters such as nozzle translation speeds, mass delivery rates, and spray angles may be predetermined by discrete particle modeling simulations to optimize the final geometry of the resulting section layer.

As explained above the respective powders used to form the adjacent powder layers (e.g., layers 48, 50 and 52 in FIG. 2) in the multi-powder deposit may be contacted with an adherent substance, such as water, an alcohol, a lacquer, or a binder, prior to or during the spraying step, so that the respective powder layers will hold a desired form until the laser processing occurs to convert the multi-powder deposit into a cohesive section plane of the component.

In some embodiments the respective powder layers of the multi-powder deposit may be delivered at different thicknesses (heights), depending on the processing shrinkage characteristics of the respective materials, to achieve a uniform thickness of the resulting section plane following laser processing. FIG. 8 of Pub. No. US 2014/0099476 (application Ser. No. 14/043,037) depicts one example of a multi-powder deposit having different layer thicknesses in which a thickness of a second powder layer 50 is greater than a thickness of a third powder layer 52 such that a resulting overlap zone 77 between the second and third powder layers 50, 52 contains a gradient material transition of variable thickness.

Although the resulting multi-powder deposit of FIG. 2 contains three adjacent powder layers 48, 50 and 52 situated on a common working surface 54A, other embodiments of the present disclosure may employ less than three powder layers or may employ more than three powder layers situated on a common working surface 54A. Furthermore, although the resulting multi-powder deposit of FIG. 2 contains three adjacent powder layers in direct contact with at least one other powder layer situated on the same working surface 54A, other embodiments may use multi-powder deposits in which at least one of the powder layers is not in direct contact with another (adjacent or otherwise) powder layer situated on the same working surface.

In some embodiments the respective powder layers of a multi-powder deposit are not delivered using the powder delivery device 60 but, instead, may be delivered to the working surface 54A within at least one preform structure constructed of different compartments allowing modular control in the placement and laser deposition of the respective powder layers. In one embodiment, for example, the first, second and third powder layers 48, 50 and 52 are delivered as a preform structure containing three separate compartments for the respective powders. Such a preform structure may also contain at least one intermediate compartment separating, for example, the first and second powder layers 48 and 50—in order to provide the overlap zone 57 (see FIG. 2) between the first and second powders and a material gradient transition as described above. In other embodiments the preform structure may be patterned such that an interface 58 between, for example, the second and third powder layers 50, 52 is in the form of an engineered mechanical interlock formed from interleaved fingers as described above.

Preform structures may also contain at least one flux composition either as a mixture with one or more of the respective powder layers (contained in the same compartment(s)) or as a separate layer containing the flux composition (contained in at least one separate compartment). In one embodiment, for example, a first compartment shaped like the metal substrate 30 of FIG. 1 contains a superalloy powder mixed with a first flux composition, a second compartment shaped like the metallic bond coat 45 contains a MCrAlY powder mixed with a second flux composition, and a third compartment shaped like the ceramic thermal barrier coating 44 contains a ceramic material which may also include a third flux composition. In another embodiment, for example, the first compartment contains only the superalloy powder, the second compartment contains only the MCrAlY powder, and the third compartment contains only the ceramic material—but the first and second compartments (superalloy/MCrAlY) are covered by a fourth compartment containing a flux composition.

The compartments of such preform structures are generally constructed of walls and a sealed periphery, in which the walls may be sheets of any type (such as fabric, film or foil that retains the components) and the periphery may include a non-metallic, non-melting, laser blocking material (such as graphite or zirconia). In some embodiments the preform structures may be constructed of certain flux materials, such as a fabric of alumina or silica fibers, which function to both maintain the shape and structural integrity of the preform structure and to provide at least one protective feature as described below during laser processing.

Figure 3:
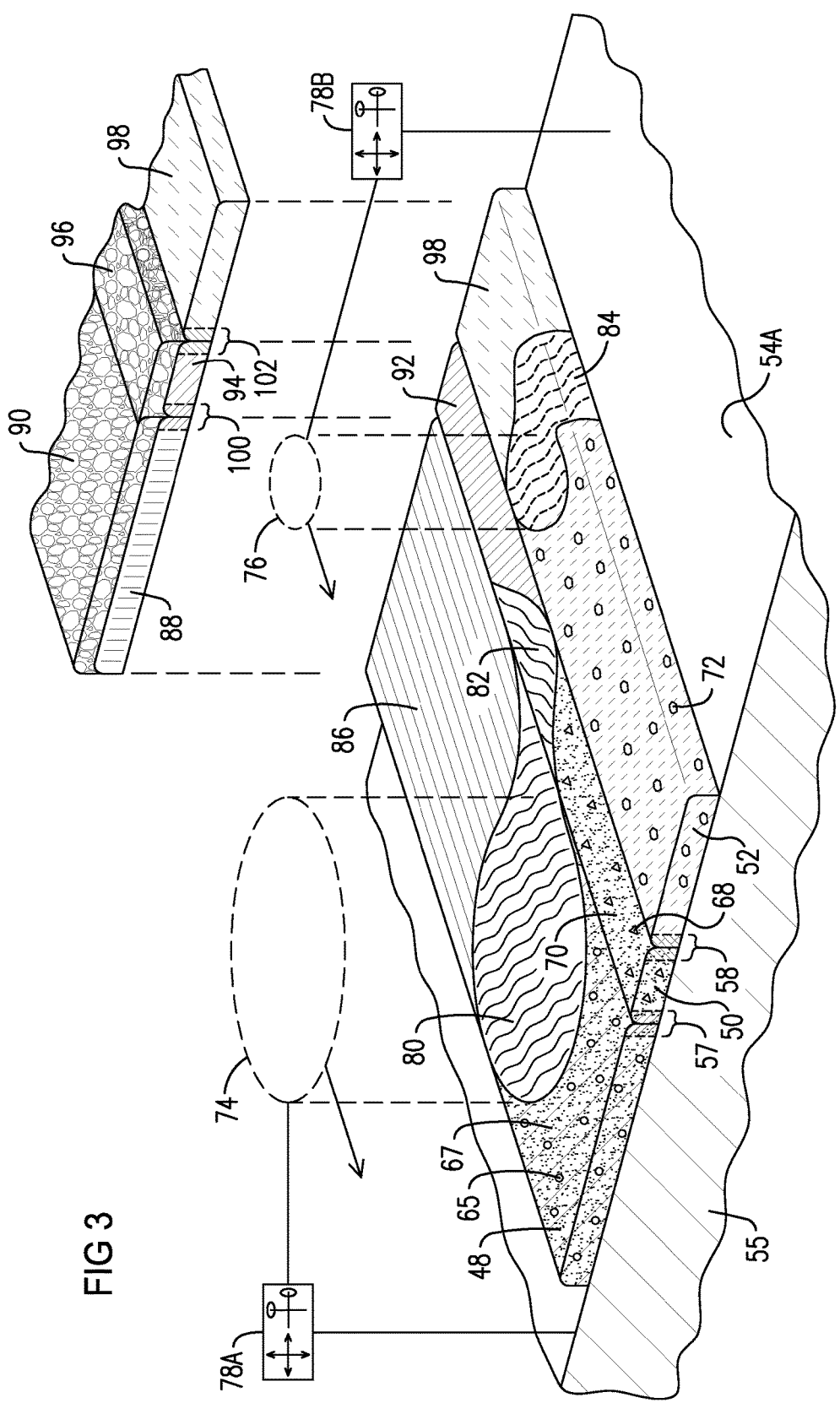
FIG. 3 is a perspective view of a method for producing a sectional plane of a multi-material component containing a superalloy layer, a bond coat layer, and a ceramic thermal barrier coating layer bonded together as an integrated system.

Following deposition of the respective powder layers (e.g., layers 48, 50 and 52 in FIG. 2) using for example a powder deliver device and/or a preform structure, the resulting multi-powder deposit is then laser processed to form a section plane of the multi-material component being fabricated. FIG. 3 illustrates one non-limiting example wherein the multi-powder deposit contains the first, second and third powder layers 48, 50 and 52 of FIG. 2, and undergoes laser processing using two separate laser beams 74 and 76 to form a section plane of the airfoil 20 of FIG. 1. In the embodiment of FIG. 3 the first powder layer 48 contains a mixture of a superalloy metal powder 65 and a first flux composition 67, the second powder layer 50 contains a mixture of a MCrAlY powder 68 and a second flux composition 70, and the third powder layer 52 contains a ceramic powder 72. This multi-powder deposit also contains a first overlap zone 57 between the first and second powder layers 48, 50, and a second overlaps zone 58 between the second and third powder layers 50, 52. These layers are all situated on a common working surface 54A of an optionally moveable work table 55. As explained above, in some embodiments the multi-powder deposit may retain its shape and adherence to the working surface 54A because the first, second and/or third powders may be mixed or wetted with an adherent substance.

Laser processing of the respective powder layers in the exemplary embodiment of FIG. 3 occurs by independently controlling the size, shape, intensity, trajectory and speed of the first and second laser beams 74, 76—such that laser heating of targeted portions of the multi-powder deposit is tailored to accommodate the shape and content of each respective powder layer. In this example the MCrAlY powder layer 50 is relatively thin in width relative to the widths of the superalloy powder layer 48 and the ceramic powder layer 52. To ensure adequate control of heat applied to the ceramic powder layer 52 (to affect only partial melting to produce a sintered TBC layer) this embodiment applies the first laser beam 74 to the superalloy powder layer 48 and applies the second laser beam 76 to the ceramic powder layer 52—and relies upon conduction heating from one or both of adjacent heated layers to melt the MCrAlY powder layer 50.

As shown in FIG. 3 the first laser beam 74 is shaped so that its width approximately matches the width of the superalloy powder layer 48, and the second laser beam 76 is shaped so that its width approximately matches the width of the ceramic powder layer 52. In some embodiments the widths of the first and/or second laser beams 74, 76 are less than or equal to the widths of the corresponding first and/or second powder layers 48, 52. In other embodiments the widths of the first and/or second laser beams 74, 76 may exceed the widths of the corresponding first and/or second powder layers 48, 52.

Heat applied to the superalloy powder layer 48 by the first laser beam 74 causes the superalloy metal powder 65 and the first flux composition 67 to melt and form a superalloy melt pool 80, which is then allowed to cool and solidify into a cooled superalloy layer 86. As shown in the cross-sectional view of FIG. 3, the cooled superalloy layer 86 is formed of a superalloy cladding layer 88 covered by a first slag layer 90. Heat from the superalloy melt pool 80 is also transferred to the adjacent MCrAlY powder layer 50 causing the MCrAlY powder 68 and the second flux composition 70 to melt and form the MCrAlY melt pool 82, which is then allowed to cool and solidify into a cooled MCrAlY layer 92. As shown in the cross-sectional view of FIG. 3, the cooled MCrAlY layer 92 is formed of a MCrAlY bond coat cladding layer 94 covered by a second slag layer 96—such that the superalloy cladding layer 88 and the MCrAlY bond coat layer 94 are bonded together via a first overlap zone 100.

Heat independently applied to the ceramic powder layer 52 by the second laser beam 76 causes the ceramic powder 72 to partially melt within a ceramic heating region 84 which is then allowed to cool and solidify into a sintered thermal barrier coating layer 98 bonded to the MCrAlY bond coat layer 94 via a second overlap zone 102. As shown in the cross-sectional view of FIG. 3, the combined thickness (height) of the cooled metallic layers 86 and 92 may exceed the thickness (height) of the sintered thermal barrier coating layer 98—due to the presence of the first and second slag layers 90 and 96 covering the superalloy cladding layer 88 and the MCrAlY bond coat layer 94. Subsequent removal of the first and second slag layers 90 and 96 may then be carried out using mechanical and/or chemical removal to yield a section plane of a component containing the superalloy layer, the MCrAlY bond coat layer, and the ceramic TBC layer bonded as an integrated system.

In other embodiments the MCrAlY powder layer 50 may be heated separately using a third laser beam that is independently controlled so that its size, shape, intensity, trajectory and speed accommodates the shape and content of the MCrAlY powder layer 50. In still other embodiment the laser energies applied to the respective powder layers of the multi-powder deposit may be provided by a single laser emitter with variable output or by multiple laser emitters with different outputs for different powder layers. Some embodiments employ a single laser source adapted to modulate laser intensity over a two-dimensional space to produce a multi-intensity laser beam in which, for example, a first laser energy and a second laser energy occur at different spatial locations within a multi-intensity laser beam. One example of a laser source capable of modulating laser intensity over a two-dimensional space is a diode laser. In other embodiments a first laser energy is provided by a diode laser source adapted, for example, to produce a rectangular laser beam, and a second laser energy is provided by a second laser source adapted to produce a non-rectangular laser beam.

The first and second laser sources 74, 76 of FIG. 3 may incorporate multi-axis movements 78A, 78B relative to the working surface 54A, so that the lasers can follow non-linear sectional profiles in a given plane, and can position and direct their laser beams for desired angles and spot sizes. Alternatively, or in additional thereto, the working table 55 may incorporate multi-axis movements relative to the first and second laser beams 74, 76.

Figure 4:
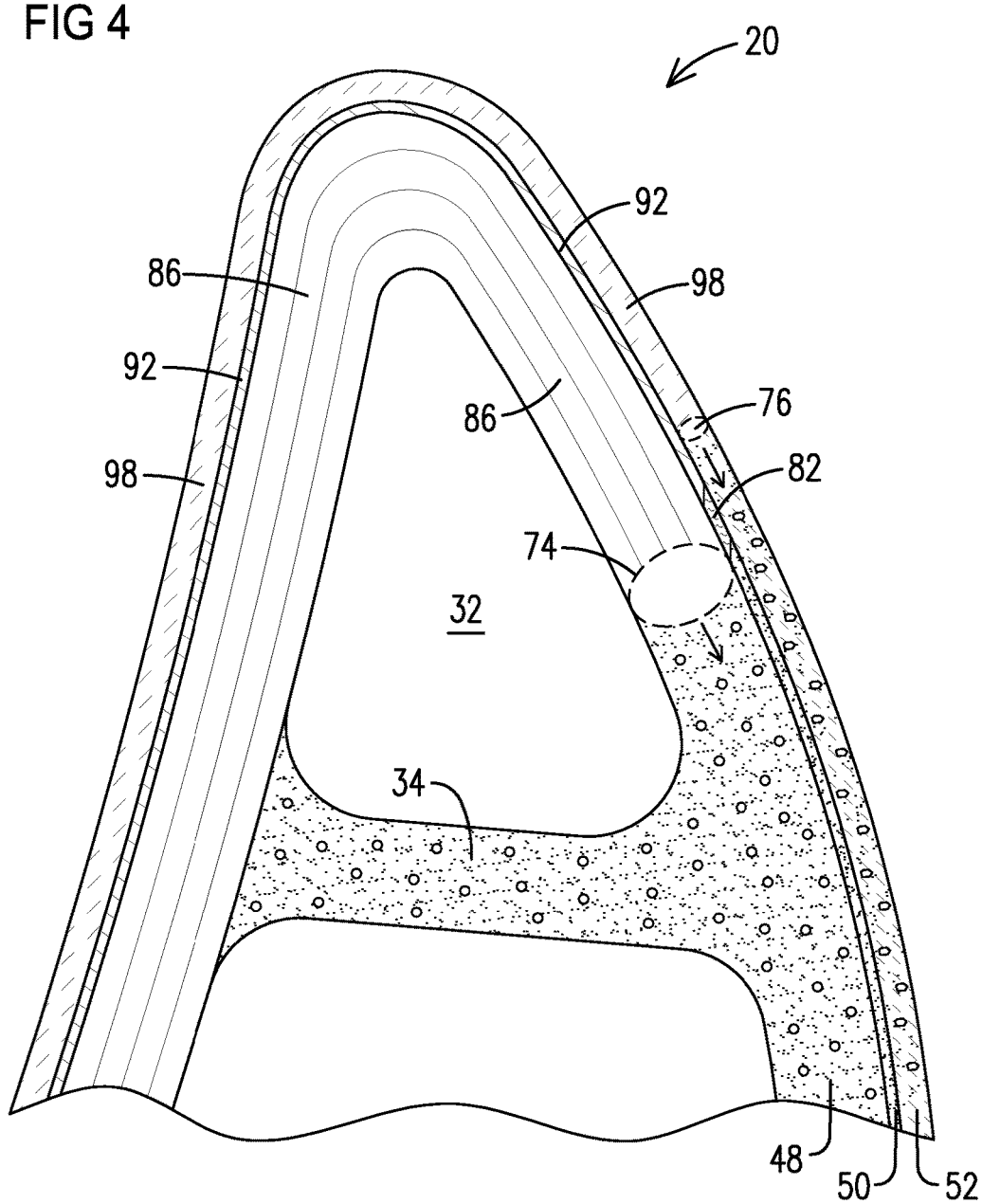
FIG. 4. is a top-down view of a method for producing a sectional plane of an exemplary gas turbine airfoil in which separate laser beams heat separate layers in the sectional plane to form an integrated system.

FIG. 4 shows a top-down view of one embodiment of the laser processing depicted in FIG. 3, in which the laser beams 74 and 76 independently follow separate paths corresponding to the non-linear sectional shape profiles of the first and third powder layers 48 and 52. The resulting section plane is a slice of the airfoil 20 depicted in FIG. 1. As shown in FIG. 4, the first laser beam 74 is traversed over the surface of the superalloy powder layer 48 to form the cooled superalloy layer 86 containing the superalloy cladding layer 88—which represents a sectional portion of the metal substrate 30 in FIG. 1. The MCrAlY powder layer 50 is heated by the adjacent superalloy melt pool 80 (or by the cooling solidified superalloy layer) to form the MCrAlY melt pool 82 which cools and solidifies into the MCrAlY bond coat layer 92—which represents a sectional portion of the metallic bond coat 45 in FIG. 1. Meanwhile, the second laser beam 76 is traversed over the surface of the ceramic powder layer 52 to form the sintered TBC layer 98—which represents a sectional portion of the ceramic TBC 44 in FIG. 1.

In some embodiments the MCrAlY powder layer 50 is not melted by the superalloy melt pool 80, but instead is deposited after formation of the superalloy layer deposit 86 and is then melted using a separate laser beam or is melted using heat from an adjacent ceramic powder layer 52 being sintered with a separate laser beam. In still other embodiments, the MCrAlY powder layer 50 may be deposited after formation of the both the superalloy layer 86 and the ceramic thermal barrier layer 98, and may then be separately melted with a laser beam. In some cases the MCrAlY powder layer 50 may be deposited after the melting of the superalloy powder layer 48—such that residual heat from the solidified (but still cooling) superalloy layer 86 causes melting of the MCrAlY powder layer 50 to form a distinct MCrAlY layer 92.

Figure 5:
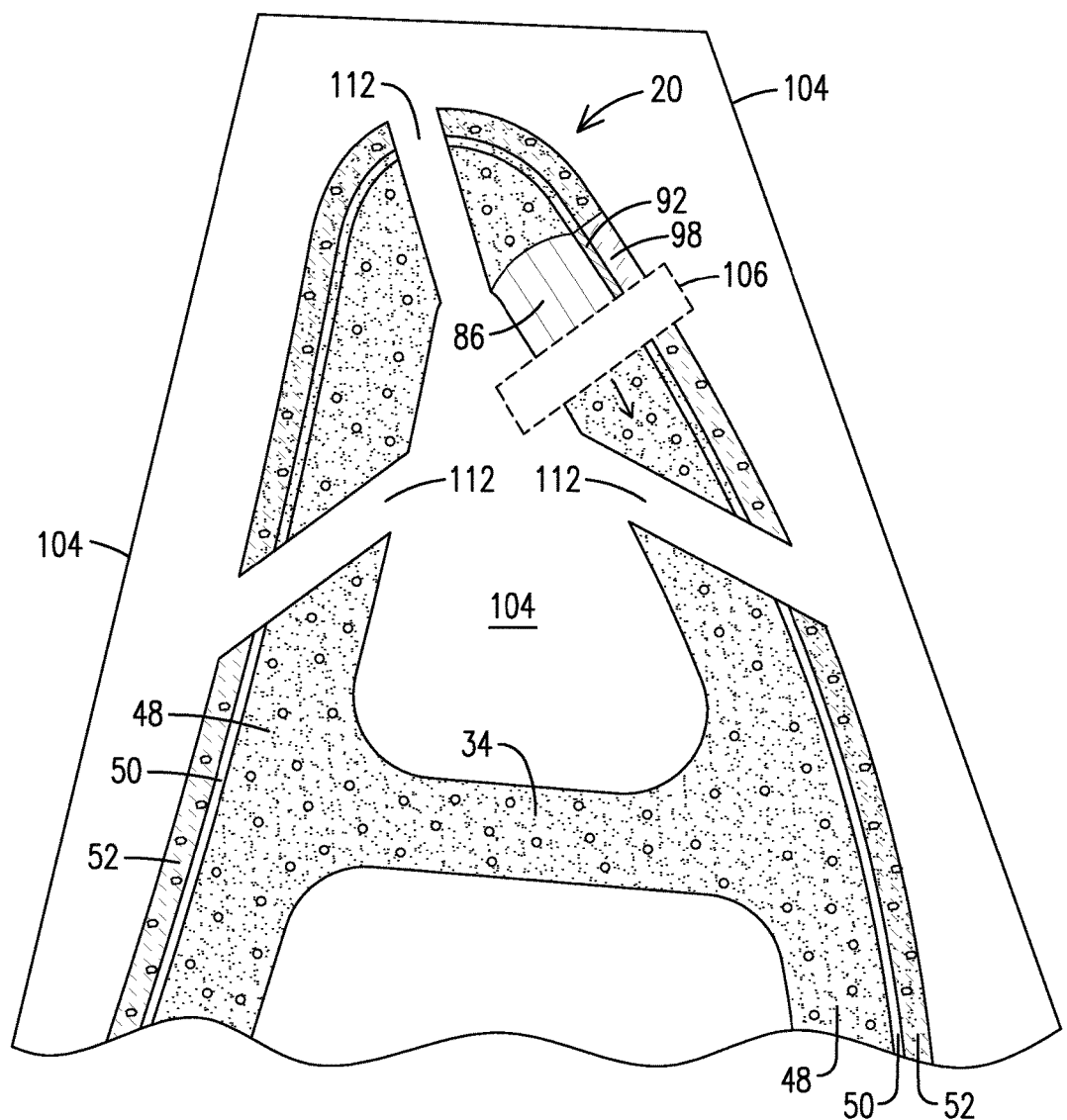
FIG. 5 is a top-down view of a method for producing a sectional plane of an exemplary gas turbine airfoil in which a diode laser is used to heat separate layers in the sectional plane and a laser absorbing mask is used to partially define the shape of the sectional plane and to control laser energy applied to different layers of the sectional plane.
Figure 6:
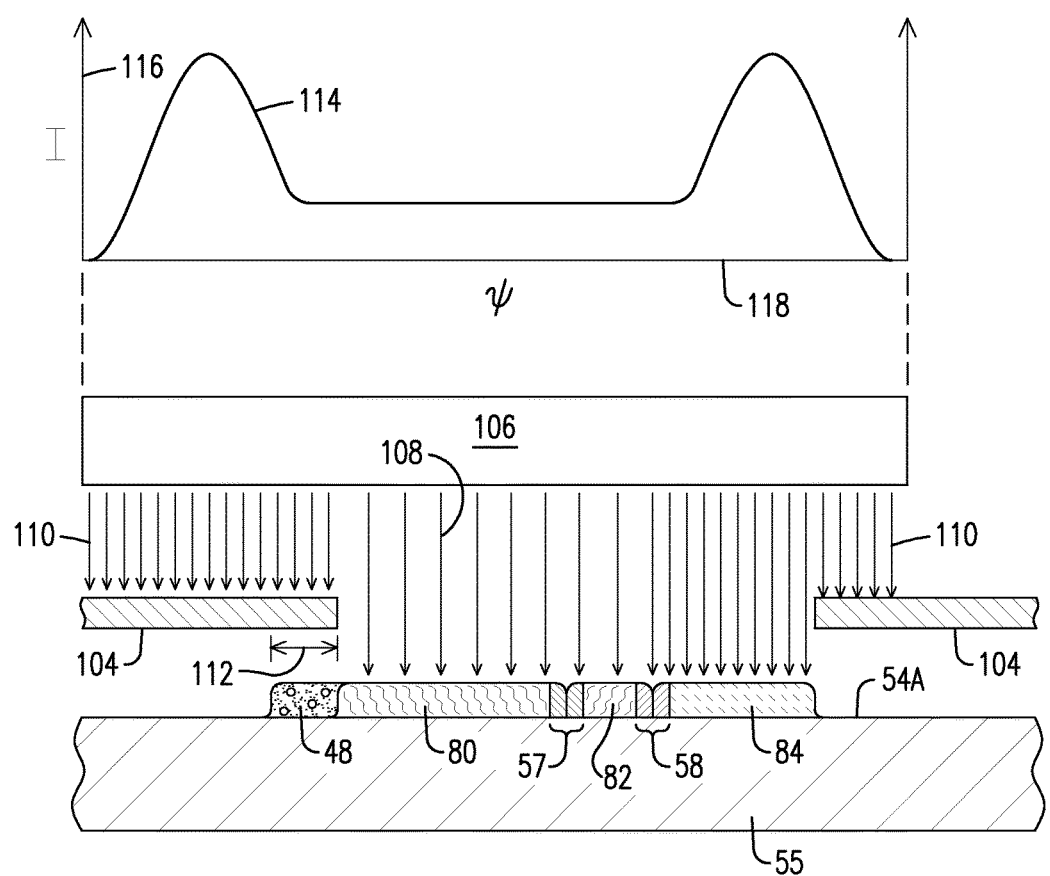
FIG. 6 is a sectional view of the method of FIG. 5 in which a laser absorbing mask is used to control the shape and intensity of laser energy applied to different layers of the sectional plane by a diode laser.

The non-linear scan paths traversed by the first and second laser beams in FIG. 4 may be employed to minimize the number of changes in laser intensity as the laser beams cover the areas of the respective powder materials. In other embodiments the laser beams may be programmed to follow parallel linear scan paths in which laser intensity of the beams could be changed for each different material heated by the beams. In still other embodiments the laser beams may be programmed to follow scan paths that are normal, or approximately normal, to the walls of the component. FIG. 4-6 of Pub. No US 2014/0099476 (application Ser. No. 14/043,037) depict exemplary scan paths including parallel linear scan paths (FIG. 5) and normal, or approximately normal, scan paths (FIG. 6).

Dimensions of at least one laser beam may be controlled and varied according to corresponding dimensions of the component being fabricated. For example, a width dimension of the laser beam may be controlled to correspond to a changing dimension, such as thickness, of a layer in the component. It is also possible to raster a laser beam back and forth as it is moved forward along a powder layer to produce an area energy distribution. Additionally, two energy beams may be rastered concurrently to achieve a desired energy distribution across a surface area, optionally with some degree of overlap between the beam patterns.

Both shape and intensity of at least one laser beam may also be controlled to accommodate both the dimensions of the powder layer being processed and its composition. While FIGS. 3 and 4 depict non-limiting examples in which the laser beams 74 and 76 are roughly circular in shape, other embodiments may employ laser beams having different shapes including rectangular or approximately rectangular shapes. Also, when more than one laser beam is used to process several different powder layers the different laser beams may employ different shapes to accommodate the various dimensions of the different powder layers.

Optical conditions and hardware used to generate broad area laser exposure may include, but are not limited to, defocusing of the laser beam, use of one or more diode lasers that generate rectangular energy sources at focus, use of integrated optics such as segmented mirrors to generate rectangular energy sources at focus, scanning (rastering) of the laser beam in one or more dimensions, and use of focusing optics of variable beam diameter. The motion of the optics and/or the working surface may be programmed as in a selective laser melting or sintering process to build a custom shape layer deposit. To that end, the laser beam sources may be controlled so that laser parameters such as laser power, dimensions of the scanning area, and traversal speed of the laser are controlled so that the thickness (width) of the resulting deposit corresponds to the thickness (width) of a previously formed (underlying) substrate, or to accommodate particular materials subjected to laser melting or sintering.

In other embodiments this high degree of control over the size, shape, trajectory and intensity of laser energy can be further enhanced by using laser absorptive materials. FIG. 5 illustrates one example in which a laser absorptive mask 104 is positioned over the multi-powder deposit such that laser energy supplied by a single diode laser source 106 is selectively transmitted to the first, second and third powder layers 48, 50 and 52. The laser absorptive mask 104 contains a laser absorptive material that blocks laser energy transmitted by the diode laser source 106—such that the mask 104 defines the inner and outer surfaces of the resulting multi-material component (by defining the inner and outer shapes of the intermediate section plane) and may also define null areas 112 corresponding to cooling channel exit holes 38 in the component.

As shown in FIG. 5, the diode laser source 106 is traversed along a non-linear sectional shape of the multi-powder deposition such that laser energy reaching the surface of the respective powder layers 48, 50 and 52 causes melting or sintering to form the corresponding superalloy layer 86, MCrAlY layer 92 and ceramic TBC layer 98. When the diode laser source 106 traverses over a portion of the laser absorptive mask 104 then laser energy is absorbed and powders lying below the mask 104 remain unaffected. After formation of the resulting section plane the unaffected powders may be removed (along with any slag layers formed by the presence of flux compositions) to yield a section plane containing one or more null areas 112 corresponding to cooling channel exit holes 38 in the airfoil 20 of FIG. 1.

In some embodiments the use of laser absorptive materials, such as the laser absorptive mask 104 in FIG. 5, may also enable a single laser source to simultaneously heat multiple powder layers with different laser intensities. The lower half of FIG. 6 shows a sectional view of the method of FIG. 5 wherein the relative placement of the diode laser source 106 and the laser absorptive mask 104 allows selective heating with different laser intensities based on the ability of the diode laser source 106 to produce a multi-intensity laser beam. The upper half of FIG. 6 shows a graph 114 of laser energy intensity 116 versus spatial location 118 within the multi-intensity laser beam of this embodiment— in which lower intensity laser photons 108 exists in the middle (inner) portion of the laser beam and higher intensity laser photons 110 exists in the side (outer) portions of the laser beam. In this non-limiting example the laser absorptive mask 104 is positioned between the diode laser source 106 and a multi-powder deposition containing the first, second and third powder layers 48, 50 and 52 of FIG. 3.

Because the diode laser source 106 is offset to the left relative to the width of the multi-powder deposition (see also FIG. 5), the higher intensity laser photons 110 emitted from the left-hand side of the diode laser source 106 are completely blocked and do not reach the working surface 54A. Consequently, only a portion of the first powder layer 48 is heated by the lower intensity laser photons 108 to form the superalloy melt pool 80, and a blocked portion of the first powder layer 48 remains unheated to produce a null area 112 corresponding to a cooling channel exit hole 38 of the airfoil 20 in FIG. 1. The diode laser source 106 is further positioned such that the second powder layer 50 is also heated by the lower intensity laser photons 108 to form the MCrAlY melt pool 82. Importantly, because the third powder layer 52 is positioned below the right-hand portion of the diode laser source 106, the ceramic powder is heated by the higher intensity laser photons 110 to form the ceramic heating section 84.

In other embodiments a single laser source (such as a diode laser source 106) may be used to simultaneously process two powder layers that are not in direct contact (for example, the superalloy powder layer 48 and the ceramic powder layer 52), and then a third powder layer (such as the MCrAlY powder layer 50) may subsequently be deposited between the resulting layers and then melted with a separate layer beam to ensure formation of distinct layers.

As illustrated in the non-limiting embodiment of FIG. 6, many different heating configurations are possible based on the shape and position of the laser absorptive mask 104 as well as the shape and size of the multi-intensity laser beam. The laser absorptive mask 104 may be a static mask or a moveable mask constructed of a laser energy tolerant material that is opaque to laser energy. Such materials may include a material such as graphite which is opaque to a wide range of laser wavelengths, or a material such as a copper which may reflect certain laser wavelengths. More than one laser absorptive mask 104 may alternatively be used, in which one or more masks may be static or moveable to create different shapes than can be altered for each section plane of the multi-material component being fabricated. By way of example, airfoils for a turbine vane or blade may define a gradual twist from the platform to the tip of the blade or vane. Accordingly, the laser absorptive mask 104 may be rotated around a central axis as the airfoil is being fabricated to create the gradual twist.

In other embodiments the laser source 106 may be adapted to produce other multi-intensity laser beams (different than the example shown in FIG. 6) in which the laser intensity is modulated over a two-dimensional space to produce various intensity patterns. This ability to produce different laser intensities at different spatial locations within a multi-intensity laser beam allows multiple powder layers to be selectively heated with a single laser source following a single scan pattern. More than one laser source capable of transmitting a multi-intensity laser beam can also be used to separately traverse different scan patterns as illustrated in FIGS. 3 and 4.

Methods of the present disclosure may be applied in a variety of contexts including the manufacture and repair of multi-wall components constructed of metal substrates bonded to a protective ceramic TBC layer optionally via an intermediate bond coat layer. The term "metal" is used herein in a general sense to describe both metals in their pure elemental form and mixtures of metals in an alloy form. In some embodiments the metal substrates may be constructed from superalloys. The term "superalloy" is used herein in a general sense to describe a highly corrosion and oxidation resistant alloy that exhibits excellent mechanical strength and resistance to creep at high temperatures, as well as good surface stability. Superalloys typically include a base alloying element of nickel, cobalt or nickel-iron. Examples of superalloys include alloys sold under the trademarks and brand names Hastelloy, Inconel alloys (e.g., IN 700, IN 738, IN 792, IN 939), Rene alloys (e.g., Rene N5, Rene 80, Rene 142), Haynes alloys, Mar M, CM 247, CM 247 LC, C 263, 718, X-750, ECY 768, 282, X45, PWA 1483 and CMSX single-crystal alloys (e.g., CMSX-4, CMSX-8, CMSX-10).

Suitable ceramic TBC materials include zirconia-containing materials—particularly chemically-stabilized zirconias (e.g., zirconium oxides blended with other metals) such as yttria-stabilized zirconias (YSZs). The bond coat layer typically takes the form of an intermediate adhesions layer, which is often an alloy of the formula MCrAlX (in which "M" represents Fe, Ni or Co, and "X" represents Ta, Re, Y, Zr, Hf, Si, B or C), a simple aluminide (NiAl), or a platinum-modified aluminide ((Ni, Pt)Al). Most typically, the bond coat layer is an intermediate layer containing an alloy of MCrAlY.

As explained above some embodiments employ at least one flux composition that provides at least one protective function. The flux composition and the resulting slag layer provide a number of beneficial functions that improve the chemical and mechanical properties of multi-materials fabricated using methods of the present disclosure.

First, the flux composition and the slag layer can increase the proportion of laser energy delivered to a powder layer in the form of heat. This increase in heat absorption may occur due to the composition and/or form of the flux composition. In terms of composition the flux may be formulated to contain at least one compound capable of absorbing laser energy at the wavelength of the laser beam. Increasing the proportion of a laser absorptive compound causes a corresponding increase in the amount of laser energy (as heat) applied to the powder layer. This increase in heat absorption can provide greater versatility by allowing the use of smaller and/or lower power laser sources that may be capable of performing more intricate laser processing of deposited powder layers. In some cases the laser absorptive compound could also be an exothermic compound that decomposes upon laser irradiation to release additional heat.

The form of the flux composition can also effect laser absorption by altering its thickness and/or particle size. As explained above, some embodiments employ at least one separate flux layer deposited onto the surface of at least on powder layer. In such cases absorption of laser heating generally increases as the thickness of the layer of the flux composition increases. Increasing the thickness of the flux layer also increases the thickness of a resulting molten slag blanket, which can further enhance absorption of laser energy. The thickness of the flux layer in methods of the present disclosure typically ranges from about 1 mm to about 15 mm. In some cases the thickness ranges from about 3 mm to about 12 mm, while in other instances the thickness ranges from about 5 mm to about 10 mm.

Reducing the average particle size of the flux composition also causes an increase in laser energy absorption (presumably through increased photon scattering within the bed of fine particles and increased photon absorption via interaction with increased total particulate surface area). In terms of the particle size, whereas commercial fluxes generally range in average particle size from about 0.5 mm to about 2 mm (500 to 2000 microns) in diameter (or approximate dimension if not rounded), flux composition in some embodiments of the present disclosure range in average particle size from about 0.005 mm to about 0.10 mm (5 to 100 microns) in diameter. In some cases the average particle size ranges from about 0.01 mm to about 5 mm, or from about 0.05 mm to about 2 mm. In other cases the average particle size ranges from about 0.1 mm to about 1 mm in diameter, or from about 0.2 mm to about 0.6 mm in diameter.

Second, the flux composition and the resulting slag layer 90, 96 can both function to shield both the region of the melt pools 80, 82 and the solidified (but still hot) metal layers 88, 94 from the atmosphere. The slag floats to the surface to separate the molten or hot metal from the atmosphere, and the flux composition may be formulated to produce at least one shielding agent which generates at least one shielding gas upon exposure to laser photons or heating. Shielding agents include metal carbonates such as calcium carbonate ($CaCO_3$), aluminum carbonate ($Al_2(CO_3)_3$), dawsonite ($NaAl(CO_3)(OH)_2$), dolomite ($CaMg(CO_3)_2$), magnesium carbonate ($MgCO_3$), manganese carbonate ($MnCO_3$), cobalt carbonate ($CoCO_3$), nickel carbonate ($NiCO_3$), lanthanum carbonate ($La_2(CO3)_3$) and other agents known to form shielding and/or reducing gases (e.g., CO, $CO_2$, $H_2$). The presence of the slag layer 90, 96 and the optional shielding gas can avoid or minimize the need to conduct laser processing in the presence of inert gases (such as helium and argon) or within a sealed chamber (e.g., vacuum chamber or inert gas chamber) or using other specialized devices for excluding air.

Third, the slag layer 90, 96 can act as an insulation layer that allows the resulting metal layers 88, 94 to cool slowly and evenly, thereby reducing residual stresses that can contribute to post weld cracking, and reheat or strain age cracking. Such slag blanketing over and adjacent to the deposited metal layers can further enhance heat conduction towards the working surface 54A which in some embodiments can promote directional solidification to form elongated (uniaxial) grains in a resulting metal substrate layer 88.

Fourth, the slag layer 90, 96 can help to shape and support the melt pools 80, 82 to keep them close to a desired height/width ratio (e.g., a ⅓ height/width ratio). This shape control and support further reduces solidification stresses that could otherwise be imparted to the resulting metal layers 88, 94.

Fifth, the flux composition and the slag layer 90, 96 can provide a cleansing effect for removing trace impurities that contribute to inferior properties. Such cleaning may include deoxidation of the melt pools 80, 82. Because the flux composition is in intimate contact with a corresponding powder layer, it is especially effective in accomplishing this function. Some flux compositions may also be formulated to contain at least one scavenging agent capable of removing unwanted impurities from the melt pool. Scavenging agents include metal oxides and fluorides such as calcium oxide (CaO), calcium fluoride ($CaF_2$), iron oxide (FeO), magnesium oxide (MgO), manganese oxides (MnO, $MnO_2$), niobium oxides (NbO, $NbO_2$, $Nb_2O_5$), titanium oxide ($TiO_2$), zirconium oxide ($ZrO_2$), and other agents known to react with detrimental elements such as sulfur and phosphorous and elements known to produce low melting point eutectics to form low-density byproducts expected to "float" into a resulting slag layer.

Additionally, the flux composition may be formulated to compensate for loss of volatilized or reacted elements during processing or to actively contribute elements to the deposit that are not otherwise provided by the powder layer. Such vectoring agents include titanium, zirconium, boron and aluminum containing compounds and materials such as titanium alloys (Ti), titanium oxide ($TiO_2$), titanite ($CaTiSiO_5$), aluminum alloys (Al), aluminum carbonate ($Al_2(CO_3)_3$), dawsonite ($NaAl(CO_3)(OH)_2$), borate minerals (e.g., kernite, borax, ulexite, colemanite), nickel titanium alloys (e.g., Nitinol), niobium oxides (NbO, $NbO_2$, $Nb_2O_5$) and other metal-containing compounds and materials used to supplement molten alloys with elements. Certain oxometallates as described below can also be useful as vectoring agents.

Flux compositions of the present disclosure may include one or more inorganic compounds selected from metal oxides, metal halides, metal oxometallates and metal carbonates. Such compounds may function as (i) optically transmissive vehicles; (ii) viscosity/fluidity enhancers; (iii) shielding agents; (iv) scavenging agents; and/or (v) vectoring agents.

Suitable metal oxides include compounds such as $Li_2O$, BeO, $B_2O_3$, $B_6O$, MgO, $Al_2O_3$, $SiO_2$, CaO, $Sc_2O_3$, TiO, $TiO_2$, $Ti_2O_3$, VO, $V_2O_3$, $V_2O_4$, $V_2O_5$, $Cr_2O_3$, $CrO_3$, MnO, $MnO_2$, $Mn_2O_3$, $Mn_3O_4$, FeO, $Fe_2O_3$, $Fe_3O_4$, CoO, $CO_3O_4$, NiO, $Ni_2O_3$, $Cu_2O$, CuO, ZnO, $Ga_2O_3$, $GeO_2$, $As_2O_3$, $Rb_2O$, SrO, $Y_2O_3$, $ZrO_2$, NiO, $NiO_2$, $Ni_2O_5$, $MoO_3$, $MoO_2$, $RuO_2$, $Rh_2O_3$, $RhO_2$, PdO, $Ag_2O$, CdO, $In_2O_3$, SnO, $SnO_2$, $Sb_2O_3$, $TeO_2$, $TeO_3$, $Cs_2O$, BaO, $HfO_2$, $Ta_2O_5$, $WO_2$, $WO_3$, $Re_2O_3$, $Re_2O_7$, $PtO_2$, $Au_2O$, $La_2O_3$, $CeO_2$, $Ce_2O_3$, and mixtures thereof, to name a few.

Suitable metal halides include compounds such as LiF, LiCl, LiBr, LiI, $Li_2NiBr_4$, $Li_2CuCl_4$, $LiAsF_6$, $LiPF_6$, $LiAlCl_4$, $LiGaCl_4$, $Li_2PdCl_4$, NaF, NaCl, NaBr, $Na_3AlF_6$, $NaSbF_6$, $NaAsF_6$, $NaAuBr_4$, $NaAlCl_4$, $Na_2PdCl_4$, $Na_2PtCl_4$, $MgF_2$, $MgCl_2$, $MgBr_2$, $AlF_3$, KCl, KF, KBr, $K_2RuCl_5$, $K_2IrCl_6$, $K_2PtCl_6$, $K_2PtCl_6$, $K_2ReCl_6$, $K_3RhCl_6$, $KSbF_6$, $KAsF_6$, $K_2NiF_6$, $K_2TiF_6$, $K_2ZrF_6$, $K_2PtI_6$, $KAuBr_4$, $K_2PdBr_4$, $K_2PdCl_4$, $CaF_2$, CaF, $CaBr_2$, $CaCl_2$, $CaI_2$, $ScBr_3$, $ScCl_3$, $ScF_3$, $ScI_3$, $TiF_3$, $VCl_2$, $VCl_3$, $CrCl_3$, $CrBr_3$, $CrCl_2$, $CrF_2$, $MnCl_2$, $MnBr_2$, $MnF_2$, $MnF_3$, $MnI_2$, $FeBr_2$, $FeBr_3$, $FeCl_2$, $FeCl_3$, $FeI_2$, $CoBr_2$, $CoCl_2$, $CoF_3$, $CoF_2$, $CoI_2$, $NiBr_2$, $NiCl_2$, $NiF_2$, $NiI_2$, CuBr, $CuBr_2$, CuCl, $CuCl_2$, $CuF_2$, CuI, $ZnF_2$, $ZnBr_2$, $ZnCl_2$, $ZnI_2$, $GaBr_3$, $Ga_2Cl_4$, $GaCl_3$, $GaF_3$, $GaI_3$, $GaBr_2$, $GeBr_2$, $GeI_2$, $GeI_4$, RbBr, RbCl, RbF, RbI, $SrBr_2$, $SrCl_2$, $SrF_2$, $SrI_2$, $YCl_3$, $YF_3$, $YI_3$, $YBr_3$, $ZrBr_4$, $ZrCl_4$, $ZrI_2$, YBr, $ZrBr_4$, $ZrCl_4$, $ZrF_4$, $ZrI_4$, $NbCl_5$, $NbF_5$, $MoCl_3$, $MoCl_5$, $RuI_3$, $RhCl_3$, $PdBr_2$, $PdCl_2$, $PdI_2$, AgCl, AgF, $AgF_2$, $AgSbF_6$, AgI, $CdBr_2$, $CdCl_2$, $CdI_2$, InBr, $InBr_3$, $InCl_2$, $InCl_3$, $InF_3$, InI, $InI_3$, $SnBr_2$, $SnCl_2$, $SnI_2$, $SnI_4$, $SnCl_3$, $SbF_3$, $SbI_3$, CsBr, CsCl, CsF, CsI, $BaCl_2$, $BaF_2$, $BaI_2$, $BaCoF_4$, $BaNiF_4$, $HfCl_4$, $HfF_4$, $TaCl_5$, $TaF_5$, $WCl_4$, $WCl_6$, $ReCl_3$, $ReCl_5$, $IrCl_3$, $PtBr_2$, $PtCl_2$, $AuBr_3$, AuCl, $AuCl_3$, AuI, $KAuCl_4$, $LaBr_3$, $LaCl_3$, $LaF_3$, $LaI_3$, $CeBr_3$, $CeCl_3$, $CeF_3$, $CeF_4$, $CeI_3$, and mixtures thereof, to name a few.

Suitable oxometallates include compounds such as $LiIO_3$, $LiBO_2$, $Li_2SiO_3$, $LiClO_4$, $Na_2B_4O_7$, $NaBO_3$, $Na_2SiO_3$, $NaVO_3$, $Na_2MoO_4$, $Na_2SeO_4$, $Na_2SeO_3$, $Na_2TeO_3$, $K_2SiO_3$, $K_2CrO_4$, $K_2Cr2O_7$, $CaSiO_3$, $BaMnO_4$, and mixtures thereof, to name a few.

Suitable metal carbonates include compounds such as $Li_2CO_3$, $Na_2CO_3$, $NaHCO_3$, $MgCO_3$, $K_2CO_3$, $CaCO_3$, $Cr_2(CO_3)_3$, $MnCO_3$, $CoCO_3$, $NiCO_3$, $CuCO_3$, $Rb_2CO_3$, $SrCO_3$, $Y_2(CO_3)_3$, $Ag_2CO_3$, $CdCO_3$, $In_2(CO_3)_3$, $Sb_2(CO_3)_3$, $C_2CO_3$, $BaCO_3$, $La_2(CO_3)_3$, $Ce_2(CO_3)_3$, $NaAl(CO_3)(OH)_2$, and mixtures thereof, to name a few.

Optically transmissive vehicles include metal oxides, metal salts and metal silicates such as alumina ($Al_2O_3$), silica ($SiO_2$), zirconium oxide ($ZrO_2$), sodium silicate ($Na_2SiO_3$), potassium silicate ($K_2SiO_3$), and other compounds capable of optically transmitting laser energy (e.g., as generated from NdYag and Yt fiber lasers).

Viscosity/fluidity enhancers include metal fluorides such as calcium fluoride ($CaF_2$), cryolite ($Na_3AlF_6$) and other agents known to enhance viscosity and/or fluidity (e.g., reduced viscosity with CaO, MgO, $Na_2O$, $K_2O$ and increasing viscosity with $Al_2O_3$ and $TiO_2$) in welding applications.

Shielding agents include metal carbonates such as calcium carbonate ($CaCO_3$), aluminum carbonate ($Al_2(CO_3)_3$), dawsonite ($NaAl(CO_3)(OH)_2$), dolomite ($CaMg(CO_3)_2$), magnesium carbonate ($MgCO_3$), manganese carbonate ($MnCO_3$), cobalt carbonate ($CoCo_3$), nickel carbonate ($NiCO_3$), lanthanum carbonate ($La_2(CO3)_3$) and other agents known to form shielding and/or reducing gases (e.g., CO, $CO_2$, $H_2$).

Scavenging agents include metal oxides and fluorides such as calcium oxide (CaO), calcium fluoride ($CaF_2$), iron oxide (FeO), magnesium oxide (MgO), manganese oxides (MnO, $MnO_2$), niobium oxides (NbO, $NbO_2$, $Nb_2O_5$), titanium oxide ($TiO_2$), zirconium oxide ($ZrO_2$) and other agents known to react with detrimental elements such as sulfur and phosphorous to form low-density byproducts expected to "float" into a resulting slag layer.

Vectoring agents include titanium, zirconium, boron and aluminum containing compounds and materials such as titanium alloys (Ti), titanium oxide ($TiO_2$), titanite ($CaTiSiO_5$), aluminum alloys (Al), aluminum carbonate ($Al_2(CO_3)_3$), dawsonite ($NaAl(CO_3)(OH)_2$), borate minerals (e.g., kernite, borax, ulexite, colemanite), nickel titanium alloys (e.g., Nitinol), niobium oxides (NbO, $NbO_2$, $Nb_2O_5$) and other metal-containing compounds and materials used to supplement molten alloys with elements.

In some embodiments the flux composition may also contain certain organic fluxing agents. Examples of organic compounds exhibiting flux characteristics include high-molecular weight hydrocarbons (e.g., beeswax, paraffin), carbohydrates (e.g., cellulose), natural and synthetic oils (e.g., palm oil), organic reducing agents (e.g., charcoal, coke), carboxylic acids and dicarboxylic acids (e.g., abietic acid, isopimaric acid, neoabietic acid, dehydroabietic acid, rosins), carboxylic acid salts (e.g., rosin salts), carboxylic acid derivatives (e.g., dehydro-abietylamine), amines (e.g., triethanolamine), alcohols (e.g., high polyglycols, glycerols), natural and synthetic resins (e.g., polyol esters of fatty acids), mixtures of such compounds, and other organic compounds.

In some embodiments flux compositions of the present disclosure include:
  5-60% by weight of metal oxide(s);
  10-70% by weight of metal fluoride(s);
  5-40% by weight of metal silicate(s); and
  0-40% by weight of metal carbonate(s),
based on a total weight of the flux composition.

In some embodiments flux compositions of the present disclosure include:
  5-40% by weight of $Al_2O_3$, $SiO_2$, and/or $ZrO_2$;
  10-50% by weight of metal fluoride(s);
  5-40% by weight of metal silicate(s);
  0-40% by weight of metal carbonate(s); and
  15-30% by weight of other metal oxide(s),
based on a total weight of the flux composition.

In some embodiments flux compositions of the present disclosure include:
  5-60% by weight of at least one of $Al_2O_3$, $SiO_2$, $Na_2SiO_3$ and $K_2SiO_3$;
  10-50% by weight of at least one of $CaF_2$, $Na_3AlF_6$, $Na_2O$ and $K_2O$;
  1-30% by weight of at least one of $CaCO_3$, $Al_2(CO_3)_3$, $NaAl(CO_3)(OH)_2$, $CaMg(CO_3)_2$, $MgCO_3$, $MnCO_3$, $CoCO_3$, $NiCO_3$ and $La_2(CO_3)_3$;
  15-30% by weight of at least one of CaO, MgO, MnO, $ZrO_2$ and $TiO_2$; and
  0-5% by weight of at least one of a Ti metal, an Al metal and $CaTiSiO_5$, based on a total weight of the flux composition.

In some embodiments the flux compositions of the present disclosure include:
  5-40% by weight of $Al_2O_3$;
  10-50% by weight of $CaF_2$;
  5-30% by weight of $SiO_2$;
  1-30% by weight of at least one of $CaCO_3$, $MgCO_3$ and $MnCO_3$;
  15-30% by weight of at least two of CaO, MgO, MnO, $ZrO_2$ and $TiO_2$; and
  0-5% by weight of at least one of Ti, Al, $CaTiSiO_5$, $Al_2(CO_3)_3$ and $NaAl(CO_3)(OH)_2$,
based on a total weight of the flux composition.

In some embodiments the flux composition contains at least two compounds selected from a metal oxide, a metal halide, an oxometallate and a metal carbonate. In other embodiments the flux composition contains at least three of a metal oxide, a metal halide, an oxometallate and a metal carbonate. In still other embodiments the flux composition may contain a metal oxide, a metal halide, an oxometallate and a metal carbonate.

Viscosity of the molten slag may be increased by including at least one high melting-point metal oxide which can act as thickening agent. Thus, in some embodiments the flux composition is formulated to include at least one high melting-point metal oxide. Examples of high melting-point metal oxides include metal oxides having a melting point exceeding 2000° C.—such as $Sc_2O_3$, $Cr_2O_3$, $Y_2O_3$, $ZrO_2$, $HfO_2$, $La_2O_3$, $Ce_2O_3$, $Al_2O_3$ and $CeO_2$.

In some embodiments the flux compositions of the present disclosure include zirconia ($ZrO_2$) and at least one metal silicate, metal fluoride, metal carbonate, metal oxide (other than zirconia), or mixtures thereof. In such cases the content of zirconia is often greater than about 7.5 percent by weight, and often less than about 25 percent by weight. In other cases the content of zirconia is greater than about 10 percent by weight and less than about 20 percent by weight. In still other cases the content of zirconia is greater than about 3.5 percent by weight, and less than about 15 percent by weight. In still other cases the content of zirconia is between about 8 percent by weight and about 12 percent by weight.

In some embodiments the flux compositions of the present disclosure include a metal carbide and at least one metal oxide, metal silicate, metal fluoride, metal carbonate, or mixtures thereof. In such cases the content of the metal carbide is less than about 10 percent by weight. In other cases the content of the metal carbide is equal to or greater than about 0.001 percent by weight and less than about 5 percent by weight. In still other cases the content of the metal carbide is greater than about 0.01 percent by weight and less than about 2 percent by weight. In still other cases the content of the metal carbide is between about 0.1 percent and about 3 percent by weight.

In some embodiments the flux compositions of the present disclosure include at least two metal carbonates and at least one metal oxide, metal silicate, metal fluoride, or mixtures thereof. For example, in some instances the flux compositions include calcium carbonate (for phosphorous control) and at least one of magnesium carbonate and manganese carbonate (for sulfur control). In other cases the flux compositions include calcium carbonate, magnesium carbonate and manganese carbonate. Some flux compositions comprise a ternary mixture of calcium carbonate, magnesium carbonate and manganese carbonate such that a proportion of the ternary mixture is equal to or less than 30% by weight relative to a total weight of the flux material. A combination of such carbonates (binary or ternary) is beneficial in most effectively scavenging multiple tramp elements.

All of the percentages (%) by weight enumerated above are based upon a total weight of the flux material being 100%.

In some embodiments commercially availed fluxes may be used such as those sold under the names Lincolnweld P2007, Bohler Soudokay NiCrW-412, ESAB OK 10.16 and 10.90, Special Metals NT100, Oerlikon OP76, Bavaria WP 380, Sandvik 50SW, 59S or SAS1, and Avesta 805. Such commercial fluxes may be ground to a smaller particle size range before use, such as a particle size range describe above.

As explained above, flux compositions of the present disclosure may be used as powders mixed with at least one powder layer (e.g., powder layers 48 and 50 in FIG. 3), or they may exists as separate layers at least partially covering at least one powder layer. Alternatively, the deposited powder layers (e.g., superalloy powder layer and MCrAlY powder layer) may be in the form of composite metal-flux particles containing both alloy material and the flux composition. Use of composite metal-flux particles in some embodiments can ensure optimal contact of alloy particles with the flux composition to maximize protection of the resulting metallic cladding layer. In embodiments involving deposition of separate metallic powder layers in some cases a single flux composition may be used with both powder layers and in other cases different flux compositions may be used for the separate powder layers. For example, in the embodiment illustrated in FIG. 3 the first powder layer 48 may contain a flux composition formulated to protect a superalloy deposit while the second powder layer 50 may contain a different flux composition formulated to protect a MCrAlY deposit.

Advantages of the methods and materials disclosed herein over known laser melting or sintering processes include high deposition rates and thick deposits in each processing layer, improved shielding that extends over the deposited metal layers without the use of inert gas, flux can enhance cleansing of the deposits to remove constituents that otherwise lead to solidification cracking, flux can enhance laser beam absorption and minimize reflection back to processing equipment, slag formation can shape and support the deposits as well as contain heat energy to slow the cooling rate thereby reducing residual stresses that otherwise contribute to strain age (reheat) cracking during post weld heat treatments, flux may compensate for elemental losses or add alloying elements, and delivery of powder layer (and optionally flux compositions) can be efficiently and selectively conducted to produce thicker deposits thereby reducing the time to fabricate multi-material components.

The methods and materials disclosed herein may be useful for original equipment manufacturing or for rapid prototyping of parts. Furthermore, the methods may be used for component repair applications, such as for forming a replacement blade tip on a gas turbine blade that has been removed from service for refurbishing. The present disclosure eliminates the need for inert cover gas, provides precise laser processing for tight tolerance control, provides a solution to the long-standing problem of oxides on fine superalloy powder used in selective laser heating processes, and allows for the crack-free deposition of superalloys having compositions beyond the previously known zone of weldability.

It will be appreciated that the use of powdered material also facilitates the deposition of functionally graded materials, where the composition of the deposited material varies across time and space. For example, if the multi-material component is a gas turbine vane, a platform portion of the vane may be a first composition and an airfoil portion of the vane may be a second, different composition. In other embodiments the alloy composition may vary from an interior wall to an exterior wall of a product, or from within a product to near its surfaces. The alloy composition may also be varied in response to anticipated operating conditions requiring different mechanical or corrosion resistance properties, and with consideration of the cost of the materials.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method, comprising:
delivering a plurality of powder layers onto a working surface to form a multi-powder deposit comprising at least two adjacent powder layers; and
concurrently applying a first laser energy of a first intensity to a first powder layer and a second laser energy of a second laser intensity to a second powder layer to form a section plane of a multi-material component in which shapes and contents of the section plane are defined at least in part by respective shapes and contents of the plurality of powder layers,
wherein a flux composition contained in the multi-powder deposit forms at least one slag layer covering at least a portion of the section plane;
wherein the first powder layer comprises a metal powder, and the second powder layer comprises a ceramic powder;
the first laser energy is directed to follow a first scan path parallel to a perimeter of the first powder layer, causing the metal powder to form a structural metal layer;
the second laser energy is directed to follow a second scan path parallel to a perimeter of the second powder layer, causing the ceramic powder to form a thermal barrier coating bonded to an adjacent metal layer; and
heat delivered directly or indirectly from the first laser energy causes the flux composition to form a slag layer covering the structural metal layer; and
wherein the multi-powder deposit comprises three adjacent powder layers;
a third powder layer situated between the first powder layer and the second powder layer comprises a metallic bond coat powder; and
heat delivered indirectly from the first laser energy causes the metallic bond coat powder to form a bond coat layer situated between, and bonded to both, the structural metal layer and the thermal barrier coating, or
heat delivered from a third laser energy of a third intensity causes the metallic bond coat powder to form the bond coat layer situated between, and bonded to both, the structural metal layer and the thermal barrier coating.

2. The method of claim 1, further comprising:
repeating the delivering and applying steps for successive section planes to fabricate the multi-material component.

3. The method of claim 1, further comprising:
controlling the first intensity to an intensity level effective to fully melt the metal powder and the flux composition in the absence of an externally-applied shielding gas to produce a non-porous structural metal layer; and
controlling the second intensity to an intensity level effective to partially melt the ceramic powder to produce a sintered thermal barrier coating bonded to the adjacent metal layer.

4. The method of claim 1, wherein:
the first powder layer further comprises the flux composition as a flux powder mixed with the metal powder; or
the multi-powder deposit further comprises a layer of the flux composition situated above the first powder layer.

5. The method of claim 1, wherein the multi-powder deposit comprises a first flux composition and a second flux composition which are different and form separate slag layers covering the at least two adjacent powder layers.

6. The method of claim 1, wherein:
the first laser energy and the second laser energy are provided by a single laser source adapted to modulate laser intensity over a two-dimensional space to produce a multi-intensity laser beam in which the first laser energy and the second laser energy occur at different spatial locations within the multi-intensity laser beam; or
the first laser energy is provided by a diode laser source adapted to produce a rectangular laser beam, and the second laser energy is provided by a second laser source adapted to produce a non-rectangular laser beam, such that a width of the rectangular laser beam is greater than a width of the non-rectangular laser beam.

7. The method of claim 1, further comprising at least one of:
controlling a shape of the first laser energy so that a width of the first laser energy impacting the first powder layer is less than or equal to a width of the first powder layer; and controlling a shape of the second laser energy so that a width of the second laser energy impacting the second powder layer is less than or equal to a width of the second powder layer.

8. The method of claim 1, wherein the flux composition comprises:
a metal oxide selected from the group consisting of $Li_2O$, $BeO$, $B_2O_3$, $B_6O$, $MgO$, $Al_2O_3$, $SiO_2$, $CaO$, $Sc_2O_3$, $TiO$, $TiO_2$, $Ti_2O_3$, $VO$, $V_2O_3$, $V_2O_4$, $V_2O_5$, $Cr_2O_3$, $CrO_3$, $MnO$, $MnO_2$, $Mn_2O_3$, $Mn_3O_4$, $FeO$, $Fe_2O_3$, $Fe_3O_4$, $CoO$, $Co_3O_4$, $NiO$, $Ni_2O_3$, $Cu_2O$, $CuO$, $ZnO$, $Ga_2O_3$, $GeO_2$, $As_2O_3$, $Rb_2O$, $SrO$, $Y_2O_3$, $ZrO_2$, $NiO$, $NiO_2$, $Ni_2O_5$, $MoO_3$, $MoO_2$, $RuO_2$, $Rh_2O_3$, $RhO_2$, $PdO$, $Ag_2O$, $CdO$, $In_2O_3$, $SnO$, $SnO_2$, $Sb_2O_3$, $TeO_2$, $TeO_3$, $Cs_2O$, $BaO$, $HfO_2$, $Ta_2O_5$, $WO_2$, $WO_3$, $ReO_3$, $Re_2O_7$, $PtO_2$, $Au_2O_3$, $La_2O_3$, $CeO_2$, $Ce_2O_3$, and mixtures thereof; and
at least one of:
(i) a metal halide selected from the group consisting of $LiF$, $LiCl$, $LiBr$, $LiI$, $Li_2NiBr_4$, $Li_2CuCl_4$, $LiAsF_6$, $LiPF_6$, $LiAlCl_4$, $LiGaCl_4$, $Li_2PdCl_4$, $NaF$, $NaCl$, $NaBr$, $Na_3AlF_6$, $NaSbF_6$, $NaAsF_6$, $NaAuBr_4$, $NaAlCl_4$, $Na_2PdCl_4$, $Na_2PtCl_4$, $MgF_2$, $MgCl_2$, $MgBr_2$, $AlF_3$, $KCl$, $KF$, $KBr$, $K_2RuCl_5$, $K_2IrCl_6$, $K_2PtCl_6$, $K_2PtCl_4$, $K_2ReCl_6$, $K_3RhCl_6$, $KSbF_6$, $KAsF_6$, $K_2NiF_6$, $K_2TiF_6$, $K_2ZrF_6$, $K_2PtI_6$, $KAuBr_4$, $K_2PdBr_4$, $K_2PdCl_4$, $CaF_2$, $CaF$, $CaBr_2$, $CaCl_2$, $CaI_2$, $ScBr_3$, $ScCl_3$, $ScF_3$, $ScI_3$, $TiF_3$, $VCl_2$, $VCl_3$, $CrCl_3$, $CrBr_3$, $CrCl_2$, $CrF_2$, $MnCl_2$, $MnBr_2$, $MnF_2$, $MnF_3$, $MnI_2$, $FeBr_2$, $FeBr_3$, $FeCl_2$, $FeCl_3$, $FeI_2$, $CoBr_2$, $CoCl_2$, $CoF_3$, $CoF_2$, $CoI_2$, $NiBr_2$, $NiCl_2$, $NiF_2$, $NiI_2$, $CuBr$, $CuBr_2$, $CuCl$, $CuCl_2$, $CuF_2$, $CuI$, $ZnF_2$, $ZnBr_2$, $ZnCl_2$, $ZnI_2$, $GaBr_3$, $Ga_2Cl_4$, $GaCl_3$, $GaF_3$, $GaI_3$, $GaBr_2$, $GeBr_2$, $GeI_2$, $GeI_4$, $RbBr$, $RbCl$, $RbF$, $RbI$, $SrBr_2$, $SrCl_2$, $SrF_2$, $SrI_2$, $YCl_3$, $YF_3$, $YI_3$, $YBr_3$, $ZrBr_4$, $ZrCl_4$, $ZrI_2$, $YBr$, $ZrBr_4$, $ZrCl_4$, $ZrF_4$, $ZrI_4$, $NbCl_5$, $NbF_5$, $MoCl_3$, $MoCl_5$, $RuI_3$, $RhCl_3$, $PdBr_2$, $PdCl_2$, $PdI_2$, $AgCl$, $AgF$, $AgF_2$, $AgSbF_6$, $AgI$, $CdBr_2$, $CdCl_2$, $CdI_2$, $InBr$, $InBr_3$, $InCl$, $InCl_2$, $InCl_3$, $InF_3$, $InI$, $InI_3$, $SnBr_2$, $SnCl_2$, $SnI_2$, $SnI_4$, $SnCl_3$, $SbF_3$, $SbI_3$, $CsBr$, $CsCl$, $CsF$, $CsI$, $BaCl_2$, $BaF_2$, $BaI_2$, $BaCoF_4$, $BaNiF_4$, $HfCl_4$, $HfF_4$, $TaCl_5$, $TaF_5$, $WCl_4$, $WCl_6$, $ReCl_3$, $ReCl_5$, $IrCl_3$, $PtBr_2$, $PtCl_2$, $AuBr_3$, $AuCl$, $AuCl_3$, $AuI$, $KAuCl_4$, $LaBr_3$, $LaCl_3$, $LaF_3$, $LaI_3$, $CeBr_3$, $CeCl_3$, $CeF_3$, $CeF_4$, $CeI_3$, and mixtures thereof;
(ii) an oxometallate selected from the group consisting of $LiIO_3$, $Li-BO_2$, $Li_2SiO_3$, $LiClO_4$, $Na_2B_4O_7$, $NaBO_3$, $Na_2SiO_3$, $NaVO_3$, $Na_2MoO_4$, $Na_2SeO_4$, $Na_2SeO_3$, $Na_2TeO_3$, $K_2SiO_3$, $K_2CrO_4$, $K_2Cr2O_7$, $CaSiO_3$, $BaMnO_4$, and mixtures thereof; and
(iii) a metal carbonate selected from the group consisting of $Li_2CO_3$, $Na_2CO_3$, $NaHCO_3$, $MgCO_3$, $K_2CO_3$, $CaCO_3$, $Cr_2(CO_3)_3$, $MnCO_3$, $CoCO_3$, $NiCO_3$, $CuCO_3$, $Rb_2CO_3$, $SrCO_3$, $Y_2(CO3)_3$, $Ag_2CO_3$, $CdCO_3$, $In_2(CO_3)_3$, $Sb_2(CO_3)_3$, $C_2CO_3$, $BaCO_3$, $La_2(CO_3)_3$, $Ce_2(CO_3)_3$, $NaAl(CO_3)(OH)_2$, and mixtures thereof.

9. The method of claim 1, wherein the flux composition comprises:
5-60% by weight of at least one of selected from the group consisting of $Al_2O_3$, $SiO_2$, $Na_2SiO_3$ and $K_2SiO_3$;
10-50% by weight of at least one selected from the group consisting of $CaF_2$, $Na_3AlF_6$, $Na_2O$ and $K_2O$;
1-30% by weight of at least one selected from the group consisting of $CaCO_3$, $Al_2(CO_3)_3$, $NaAl(CO_3)(OH)_2$, $CaMg(CO_3)_2$, $MgCO_3$, $MnCO_3$, $CoCO_3$, $NiCO_3$ and $La_2(CO3)_3$;
15-30% by weight of at least one selected from the group consisting of $CaO$, $MgO$, $MnO$, $ZrO_2$ and $TiO_2$; and
0-5% by weight of at least one selected from the group consisting of a Ti metal, an Al metal, $TiO_2$ and $CaTiSiO_5$.

10. A method, comprising:
(i) directing laser energy from at least two laser beams towards a plurality of powder layers, such that a first powder layer is heated by a first laser energy and a second powder layer is heated by a second laser energy;
(ii) independently controlling shape and intensity of the first laser energy and the second laser energy, such that a width of the first laser energy is less than or equal to a width of the first powder layer, a width of the second laser energy is less than or equal to a width of the second powder layer, and an intensity of the first laser energy is different than an intensity of the second powder layer; and
(iii) independently controlling trajectories of the first laser energy and the second laser energy, such that the first laser energy is directed to follow a first scan path parallel to a perimeter of the first powder layer, and the second laser energy is directed to follow a second scan path parallel to a perimeter of the second powder layer, to form a section plane of a multi-material component in which shapes and contents of the section plane are defined at least in part by respective shapes and contents of the plurality of powder layers;
wherein the first powder layer comprises a metal powder which melts and cools to form a structural metal layer;
the second powder layer comprises a ceramic powder which partially melts and cools to form a thermal barrier coating bonded to an adjacent metal layer; and
heat delivered directly or indirectly from the first laser energy causes a flux composition to form a slag layer covering the structural metal layer; and
wherein the plurality of powder layers comprises three adjacent powder layers;
a third powder layer situated between the first powder layer and the second powder layer comprises a metallic bond coat powder; and
heat delivered indirectly from the first laser energy causes the metallic bond coat powder to form a bond coat layer situated between, and bonded to both, the structural metal layer and the thermal barrier coating, or
heat delivered from a third laser energy of a third intensity causes the metallic bond coat powder to form the bond coat layer situated between, and bonded to both, the structural metal layer and the thermal barrier coating.

11. The method of claim 10, further comprising:
repeating steps (i), (ii) and (iii) for successive section planes to fabricate the multi-material component.

12. The method of claim 10, wherein:
the section plane comprises at least one null area corresponding to at least one empty space in the multi-material component; and
the null area is formed by performing one or both of:
controlling the laser energy from the at least two laser beams by cycling laser energies off in the null area, or by reducing laser energy intensities in the null area, such that powder contained in the null area is not melted, and
blocking laser energy from impacting the powder contained in the null area with a laser absorbing mask having a mask shape that defines a shape of the null area.

13. A method, comprising:
(a) directing laser energy from a laser source towards a plurality of powder layers, such that a first powder layer is heated by a first laser intensity and a second powder layer is heated by a second laser intensity, wherein the laser source is adapted to modulate laser intensity over a two-dimensional space to produce a multi-intensity laser beam in which the first laser intensity and the second laser intensity occur at different spatial locations within the multi-intensity laser beam;

(b) controlling shape and intensity of the multi-intensity laser, such that a width of a first laser energy heating the first powder layer at the first laser intensity is less than or equal to a width of the first powder layer, and a width of a second laser energy heating the second powder layer at the second laser intensity is less than or equal to a width of the second powder layer;

(c) controlling the laser source, such that the first laser energy follows a first scan path parallel to a perimeter of the first powder layer, and the second laser energy follows a second scan path parallel to a perimeter of the second powder layer; and (d) partially blocking the multi-intensity laser beam with a laser absorbing mask, to form a section plane of a multi-material component in which a shape of the section plane is defined by both a shape of the plurality of powder layers and a shape of the laser absorbing mask, and contents of the section plane are defined by respective contents of the plurality of powder layers;

wherein the first powder layer comprises a metal powder which melts and cools to form a structural metal layer;

the second powder layer comprises a ceramic powder which partially melts and cools to form a thermal barrier coating bonded to an adjacent metal layer; and heat delivered directly or indirectly from the first laser energy causes a flux composition to form a slag layer covering at least the structural metal layer; and wherein the plurality of powder layers comprises three adjacent powder layers;

a third powder layer situated between the first powder layer and the second powder layer comprises a metallic bond coat powder;

the shape and intensity of the multi-intensity laser is further controlled such that a width of a third laser energy heating the third powder layer at a third laser intensity is less than or equal to a width of the third powder layer; and heat delivered to the third powder layer causes the metallic bond coat powder to form a bond coat layer situated between, and bonded to both, the structural metal layer and the thermal barrier coating.

14. The method of claim 13, further comprising:

repeating at least steps (a), (b) and (c) for successive section planes to fabricate the multi-material component.

* * * * *